Dec. 4, 1956  J. DIAZ  2,772,438
VACUUM DEBRIS COLLECTOR AND INCINERATOR
Filed April 15, 1952  2 Sheets-Sheet 1

INVENTOR.
JUAN DIAZ
BY Howard J. Whelan
ATTORNEY

Dec. 4, 1956  J. DIAZ  2,772,438
VACUUM DEBRIS COLLECTOR AND INCINERATOR
Filed April 15, 1952  2 Sheets-Sheet 2

INVENTOR.
JUAN DIAZ

BY *Howard J. Whelan,*
ATTORNEY

United States Patent Office 2,772,438
Patented Dec. 4, 1956

2,772,438

VACUUM DEBRIS COLLECTOR AND INCINERATOR

Juan Diaz, Baltimore, Md.

Application April 15, 1952, Serial No. 282,364

3 Claims. (Cl. 15—314)

This invention relates to mobile vacuum debris collectors and incinerators and more particularly to those having automatic loading and disposal units self contained.

It is an object of this invention to provide a new and improved vacuum operated debris collector for removing refuse from yards, lots, cellars and other inclosures and having the suction piping self supporting and movably operated from one place to another by remote control.

It is a further object of this invention to provide a new and improved mobile refuse and debris collector and incinerator that can be moved from one location to another and provided with a nozzle and suction piping that can be automatically moved over a prescribed area by one operator from a remote point.

It is an additional object of this invention to provide a self contained portable refuse and debris collector and incinerator in which the suction tube can be swung in a horizontal plane and bent up or down vertically and with the suction and incinerator apparatus all controlled from a single point by a single operator.

Other objects will become apparent as the invention is more fully set forth.

For a clearer understanding of the invention, the accompanying drawings are provided to show a particular form of the invention by way of example, and are explained in detail in the following description, while the claims indicate the scope of the invention.

In the drawings.

Similar reference characters refer to similar parts throughout the drawings.

Figure 1:
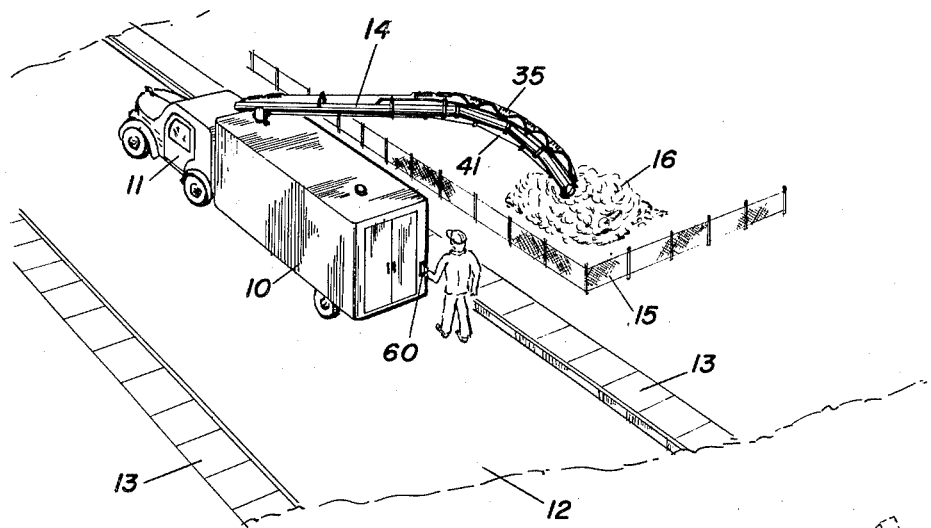
Figure 1 is a view in perspective showing the mobile vacuum debris collector and incinerator embodying this invention.
Figure 2:
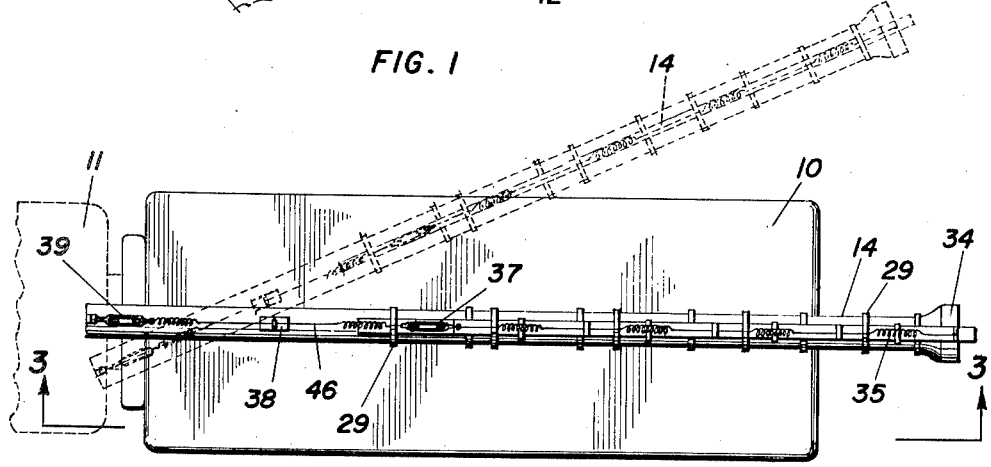
Figure 2 is a plan view of a trailer with the suction tube rotated to a position parallel to the length of the trailer.
Figure 3:
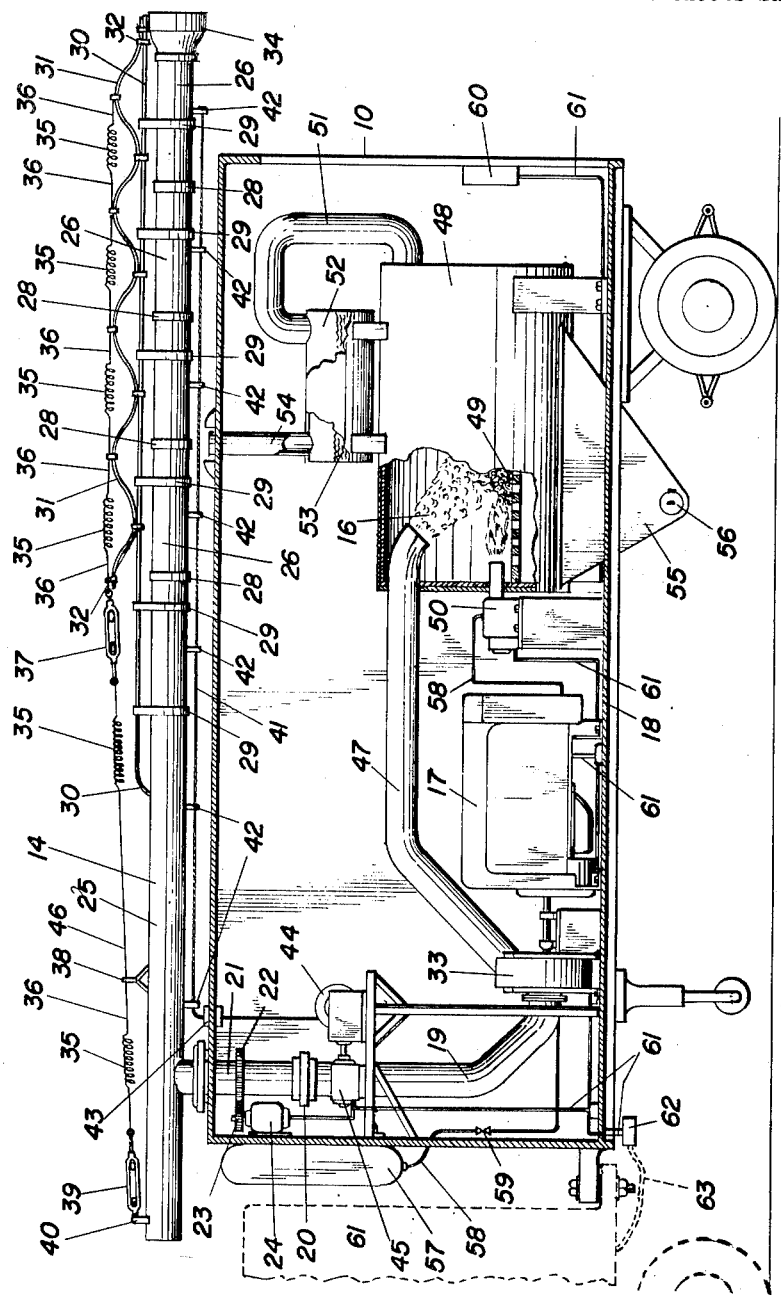
Figure 3 is a sectional view taken along line 3—3 of Figure 2.

In the construction shown in the drawings a mobile vacuum debris collector and incinerator is mounted in a trailer 10 and pulled from one place to another by a tractor 11. In Figure 1, the tractor and trailer are shown in a streetbed 12 and located between pavements 13, and positioned so that the rotatable and bendable suction tube 14 may extend over a fence 15 to suck up and remove debris 16 and unload it into an incinerator positioned inside the trailer where it is disposed of. The trailer body and tractor are of conventional construction and design and will not be described as their construction is well known to the general public. A conventional internal combustion engine 17 is mounted on the floor 18 of the trailer 10 and is of the package or self contained type having in its cabinet and engine, fuel tanks, radiator and other equipment needed to make the engine self starting and the operation controllable from a remote part of the trailer. The engine drives a fan 33 to create a suction in stand pipe 19, extending from the fan 33 to the ball bearing swivel connection 20, and connects with an upper section of pipe 21 that is rotated by a gear 22 attached to it and meshes with a drive gear 23 mounted on a motor 24 and for turning the suction tube 14 through an arc of any desired degree. The pipe section 25 of the bendable suction tube or flexible boom 14 is attached to the upper end of pipe 21 and rotates therewith. The section 25 is provided with a cleanout opening at the rear end for access to the interior of the section and is joined at its front end with several short sections of pipe 26 that are pivotally connected by pivot or swivel bearings 28. Tie-supports 29 are mounted on pipes 26 and 25 and support a flat spring member 30 that is mounted above and out of contact with said pipes 26 and 25 so that their bending motions will not be interfered with during the raising and lowering of the suction tube or boom 14. On top of the spring member 30 is slidably mounted a serpentine spring member 31 that is held in sliding alignment with member 30 by clips 32. A tensioning member comprising springs 35 and straight sections 36 connects with the top of the front loop 31 of the serpentine spring member 31 and the other end of the tensioning member connects with one end of a turnbuckle 37, and the other end of the turnbuckle connects with another straight section 36 having spring sections 35 that pass through a cradle 38 and terminates at the turnbuckle 39 anchored to a stop 40. The front end of the flat spring 30 and the serpentine spring 31 are anchored against the nozzle 34. The turnbuckles 37 and 39 are adjusted to tighten the tensioning member and align the pipe sections 25 and 26 and nozzle 34, of the suction tube 14 when in normal travelling position. A cable 41 is attached at one end to the front pipe section 26 near the nozzle 34 and is threaded through supports 42 and down through a thimble 43 to be wound on a winch 44 when rotated by a motor 45. The debris is drawn through the nozzle 34 and suction tube 14 by the fan 33 and then passes through tubing 47 into the incinerator 48 and rests on the grate 49 where it is burnt by an oil burner 50. The smoke from the incinerator passes through the smoke-pipe 51 and into the collector 52 and any burning particles passing through the smoke pipe 51 is directed downward into a body of water provided in the collector 52 and extinguished, the smoke then passes up through the stack 54 to the outside. An ashpit 55 is positioned below the incinerator 48 to collect the ashes from the grate 49. A cleanout door 56 is positioned in the ashpit to clean out the ashes therefrom. A fuel oil tank 57 supplies oil to the burner 50 through piping 58 and is controlled by a valve 59. This device may be operated from the engine 17 or by motors, without deviating from the invention.

In the operation of the device the electric supply 63 is attached to a junction box 62 and the electric current passes over wires encased in conduit 61 and passes between the junction box 62, motors, engine, and oil burner and is controlled from the switch box 60, that encloses the switches used to control the various equipment. The switch used to operate motor 24 is closed and the motor 24 through gears 22 and 23 rotates the suction tube 14 until it rests over the pile of debris to be disposed of. The motor 24 is stopped and the switch operating motor 45 is closed and the winch 44 draws in the cable 41 and bends the nozzle 34 down towards the debris to be removed. The engine 17 is started from the switch box 60 and operates the suction fan 33 that draws the debris through the nozzle 34 and piping of the suction tube 14 and through the tubing 47 into the incinerator 48 and it is deposited on the grate 49. The oil burner 50 is then started from the switch box 60 and burns the debris on the grate 49 and the ashes fall through it into the ash pit 55. Any burning embers that may float up smoke pipe 51 will be diverted downward into the water bath 53 which extinguishes the burning embers to prevent them from being discharged into the atmosphere. The smoke will then pass up through stack 54 to the outside. The nozzle 34 can be rotated in a circle and moved up and down to contact the debris to be moved.

This device can be used to suck up various materials that do not need burning for disposal.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A perambulating debris collector comprising a vehicle having means for receiving debris, a roof for said vehicle, a flexible suction pipe above and normally paralleling the roof of the vehicle, a stand pipe connected to one end of the suction pipe and extending within the vehicle, a swivel connection on said stand pipe, means in the vehicle for rotating the portion of the stand pipe connected to the suction pipe, means for bending the front end of the suction pipe towards the debris to be sucked into the vehicle, wherein the means for bending the front end of the suction pipe consist of a winch within the vehicle, means for rotating said winch, and a cable between said winch and the front end of the suction pipe.

2. A perambulating debris collector as set forth in claim 1 including flexible tensioning means carried by and between the front and rear ends of the said suction pipe.

3. A perambulating debris collector as set forth in claim 1, including a connection between the standpipe and an incinerator carried within the vehicle.

References Cited in the file of this patent

UNITED STATES PATENTS

| | | |
|---|---|---|
| 484,191 | Furnas | Oct. 11, 1892 |
| 514,676 | Furnas | Feb. 13, 1894 |
| 901,490 | Sellers | Oct. 20, 1908 |
| 1,055,977 | Lasley | Mar. 11, 1913 |
| 1,069,608 | Ewing et al. | Aug. 5, 1913 |
| 1,665,487 | Washburn | Apr. 10, 1928 |
| 1,864,633 | Bessent | June 28, 1932 |
| 1,908,560 | Ruemelin | May 9, 1933 |
| 2,114,257 | Thomas | Apr. 12, 1938 |
| 2,184,384 | Gregoric | Dec. 26, 1939 |
| 2,458,258 | Furr | Jan. 4, 1949 |
| 2,608,023 | Dillon | Aug. 26, 1952 |

FOREIGN PATENTS

| | | |
|---|---|---|
| 486,505 | Great Britain | June 2, 1936 |